US012739708B2

(12) United States Patent
Xu et al.

(10) Patent No.: US 12,739,708 B2
(45) **Date of Patent: *Sep. 15, 2026**

(54) MULTICAST AND BROADCAST SERVICES (MBS) MOBILITY WITH SERVICE CONTINUITY IN CONNECTED STATE

(71) Applicant: Apple Inc., Cupertino, CA (US)

(72) Inventors: Fangli Xu, Beijing (CN); Haijing Hu, Beijing (CN); Naveen Kumar R. Palle Venkata, San Diego, CA (US); Ralf Rossbach, Munich (DE); Sarma V. Vangala, Campbell, CA (US); Sethuraman Gurumoorthy, San Jose, CA (US); Srinivasan Nimmala, San Jose, CA (US); Sudeep Manithara Vamanan, Nuremberg (DE); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,112

(22) Filed: Apr. 30, 2024

(65) Prior Publication Data

US 2024/0284264 A1 Aug. 22, 2024

Related U.S. Application Data

(63) Continuation of application No. 17/438,353, filed as application No. PCT/CN2020/124829 on Oct. 29, 2020, now Pat. No. 11,991,562.

(51) Int. Cl.
*H04W 36/00* (2009.01)
*H04W 4/06* (2009.01)
(Continued)

(52) U.S. Cl.
CPC ......... *H04W 36/0007* (2018.08); *H04W 4/06* (2013.01); *H04W 36/0235* (2023.05); *H04W 36/08* (2013.01)

(58) Field of Classification Search
CPC ............... H04W 36/0007; H04W 4/06; H04W 36/0235; H04W 36/08; H04W 36/026; H04L 47/34; H04L 69/22
See application file for complete search history.

(56) References Cited

U.S. PATENT DOCUMENTS 7,509,127 B2 3/2009 Wang
2003/0007490 A1* 1/2003 Yi ........................... H04L 69/22 370/310
2005/0169205 A1 8/2005 Grilli
(Continued)

FOREIGN PATENT DOCUMENTS

CN 101166174 4/2008
CN 101291462 10/2008
(Continued)

OTHER PUBLICATIONS

Office Action for CN 202080106838.2; Dec. 10, 2024.
(Continued)

*Primary Examiner* — Vinncelas Louis
(74) *Attorney, Agent, or Firm* — Kowert, Hood, Munyon, Rankin & Goetzel, P.C.

(57) ABSTRACT

Techniques are described for improving service continuity for Multicast and Broadcast Services (MBS) communications during handover. Techniques are included for supporting lossless handover and data forwarding during handover for peer-to-multiple (PTM) MBS transmission. Lossless handover may be achieved in part by the user equipment (UE) providing to the target base station an indication of the next packet of the MBS session to be received following an RRC reconfiguration message, and an indication of any MBS packets provided by the source base station prior to the
(Continued)

RRC reconfiguration message that were not properly received by the UE. Data forwarding may be performed from the source base station to the target base station if the MBS session was not configured on the target base station prior to the handover. Data forwarding may be omitted if the MBS session was configured on the target base station prior to the handover.

14 Claims, 9 Drawing Sheets

(51) Int. Cl.
*H04W 36/02* (2009.01)
*H04W 36/08* (2009.01)

(56) References Cited

U.S. PATENT DOCUMENTS

2008/0141097 A1 6/2008 Vayanos
2009/0040982 A1 2/2009 Ho
2018/0279193 A1 9/2018 Park
2023/0262515 A1* 8/2023 Xu .......................... H04L 47/34 370/229
2023/0262533 A1* 8/2023 Fujishiro ................. H04W 4/06 370/312
2023/0292200 A1* 9/2023 Dai ................... H04W 36/0007
2024/0031066 A1* 1/2024 Shirivastava ........... H04W 4/06

FOREIGN PATENT DOCUMENTS

CN 108781387 11/2018
WO 2011079478 7/2011
WO 2015001746 1/2015
WO 2020190180 9/2020
WO 2021168257 8/2021
WO 2022086239 4/2022
WO 2022087253 4/2022

OTHER PUBLICATIONS

International Search Report for PCT Patent Application No. PCT/CN2020/124829; Jul. 29, 2021.
ZTE "Consideration on lossless handover for NR MBS"; 3GPP TSG-RAN WG3 #110-e R3-206532; Nov. 12, 2020.
ZTE et al. "Consideration on lossless handover for NR MBS"; 3GPP TSG-RAN WG3 #113-e R2-2009743; Nov. 13, 2020.
Extended European Search Report for EP Patent Application No. 20959126.2; Oct. 27, 2023.
Qualcomm Inc "NR Multicast Broadcast mobility enhancements with service"; 3GPP TSG-RAN WG2 #112e R2-2009035; Nov. 2, 2020.
Office Action for JP Patent Application No. 2023-525618; Mar. 29, 2024.
CMCC "Summary of [Post111-e][905][MBS] Connected Mode Mobility with Service Continuity (CMC)"; 3GPP TSG-RAN WG2 Meeting #112e R2-2010385; Nov. 2, 2020.
Examination Report for IN 202317029187; Apr. 29, 2026.
Notice of Allowance for JP 2025-048992; Dec. 22, 2025.
CATT "TP on TS 38.300 on MBS service continuity" 3GPP TSG-RAN WG3 #110-e R3-206302; Nov. 2, 2020.
Qualcomm Inc. "NR Multicast Broadcast mobility enhancements with service" 3GPP TSG-RAN WG2 Meeting #112e R2-2009035; Nov. 2, 2020.

* cited by examiner

MULTICAST AND BROADCAST SERVICES (MBS) MOBILITY WITH SERVICE CONTINUITY IN CONNECTED STATE

PRIORITY INFORMATION

This application is a continuation of U.S. patent application Ser. No. 17/438,353 titled "Multicast and Broadcast Services (MBS) Mobility with Service Continuity in Connected State", filed on Sep. 10, 2021, which is a national stage application of International Application No. PCT/CN2020/124829, filed on Oct. 29, 2020, titled "Multicast and Broadcast Services (MBS) Mobility with Service Continuity in Connected State", which is hereby incorporated by reference in its entirety.

FIELD

The present application relates to wireless communications, and more particularly to systems, apparatus, and methods for improving service continuity for Multicast and Broadcast Services (MBS) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

One aspect of cellular communication systems involves Multicast and Broadcast Services (MBS) communications. Improvements in the field are desired.

SUMMARY

Embodiments are presented herein of apparatus, systems, and methods for improving Multicast and Broadcast Services (MBS) communications through service continuity during handover.

A method is disclosed for performing communications of a Multicast and Broadcast Services (MBS) session. According to the method, a target base station of a wireless communication network may receive, from a remote base station of the wireless communication network, a request to initiate a handover of the MBS session for a user equipment (UE) from the source base station to the target base station. The target base station may receive an indication of a next protocol data unit (PDU) of the MBS session to be received by the UE. The target base station may transmit to the UE a peer-to-peer (PTP) message including the next PDU of the MBS session, wherein the next PDU of the MBS session was previously transmitted by the source base station via a peer-to-multiple (PTM) message after the request to initiate the handover.

In some scenarios, the target base station may receive from the UE an indication of a dropped PDU of the MBS session, wherein the dropped PDU was transmitted by the source base station, but was not properly received by the UE. The target base station may transmit to the UE a peer-to-peer message including the dropped PDU.

In some scenarios, the indication of the next PDU and the indication of the dropped PDU may be received from the UE in a Packet Data Convergence Protocol (PDCP) status report.

In some scenarios, the indication of the next PDU may be received from the source base station.

In some scenarios, the target base station may determine whether to transmit subsequent PDUs of the MBS session via peer-to-peer messages or via peer-to-multiple messages, based at least in part on a number of UEs serviced by the target base station that are subscribed to the MBS session.

In some scenarios, the target base station may, in response to receiving the request to initiate the handover, establish the MBS session with a core network element of the wireless communication network. The target base station may receive, from the source base station, at least one PDU of the MBS session to be forwarded to the UE, the at least one PDU including the next PDU of the MBS session. The target base station may, subsequent to receiving the next PDU, receive, from the core network element, a subsequent PDU of the MBS session.

In some scenarios, the target base station may receive from the UE an indication that MBS handover reconfiguration at the UE is complete. The target base station may, in response to receiving the indication that MBS handover reconfiguration at the UE is complete, and subsequent to establishing the MBS session with the core network element, provide to the source base station an instruction to stop forwarding PDUs of the MBS session.

In some scenarios, the target base station may forward to the UE, via at least one PTP message, each PDU of the at least one PDU of the MBS session received from the source base station prior to receiving the indication that MBS handover reconfiguration at the UE is complete.

In some scenarios, the target base station may establish, with a core network element of the wireless communication network, the MBS session, wherein the MBS session is established before receiving the request to initiate the handover.

In some scenarios, the target base station may receive, from a core network element of the wireless communication network, an indication of a sequence number to be allocated to a specified PDU of the MBS session. The target base station may allocate sequential sequence numbers to PDUs subsequent to the specified PDU.

In some scenarios, the target base station may receive, from a core network element of the wireless communication network, an MBS packet including MBS payload data for the MBS session, the MBS packet having a packet sequence number. The target base station may transmit to the UE a packet including the MBS payload data, wherein the packet sequence number of the MBS packet is used as a downlink (DL) Packet Data Convergence Protocol (PDCP) sequence number of the transmitted packet.

A method is described of performing communications of a Multicast and Broadcast Services (MBS) session. According to the method, a wireless communication device may receive, from a first base station of a wireless network, a multicast transmission including at least one data packet of a multicast session. The wireless communication device may receive, from the first base station, an instruction to perform a handover to a second base station of the wireless network. The wireless communication device may, in response to receiving the instruction, stop receiving transmissions from the first base station and establish a connection with the second base station. The wireless communication device may receive, from the second base station, a unicast transmission including a next sequential data packet of the multicast session following a last data packet of the multicast session received from the first base station, wherein the next sequential data packet was previously included in a multicast transmission from the first base station after the wireless communication device stopped receiving transmissions from the first base station.

In some scenarios, the wireless communication device may transmit, to the second base station, prior to receiving the unicast transmission, an identifier of the next sequential packet.

In some scenarios, the wireless communication device may receive, from the second base station, a unicast transmission including a dropped data packet of the multicast session, wherein the dropped data packet was included in a multicast transmission from the first base station prior to the instruction to perform the handover, but was not properly received by the UE.

In some scenarios, the wireless communication device may transmit, to the second base station, prior to receiving the unicast transmission including the dropped data packet, an identifier of the dropped data packet.

In some scenarios, the wireless communication device may receive, from the second base station, a multicast transmission including at least one data packet of the multicast session.

In some scenarios, the instruction to perform the handover to a second base station may include configuration information for establishing the connection with the second base station for multicast transmissions.

A method is described of performing communications of a Multicast and Broadcast Services (MBS) session. According to the method, a first base station of a wireless communication network may transmit, to a user equipment (UE) a multicast transmission including at least one data packet of a multicast session. In response to determining to initiate a handover procedure to handover the UE to a second base station of the wireless communication network, the first base station may transmit to the UE an instruction to perform the handover. Subsequent to transmitting the instruction, the first base station may transmit to the second base station an indication of a next packet of the MBS session to be transmitted to the UE. Subsequent to transmitting the instruction, first base station may begin forwarding to the second base station packets of the MBS session to be transmitted to the UE, the forwarded packets of the MBS session including the next packet. The first base station may stop forwarding the packets of the MBS session in response to receiving from the second base station an indication that the handover is complete.

In some scenarios, the first base station may provide to the second base station a handover request including information regarding the MBS session.

In some scenarios, the first base station may receive from the second base station a handover request acknowledge message indicating MBS session configuration information for the second base station. The first base station may include the MBS session configuration information for the second base station in the instruction to perform the handover.

Devices, apparatuses, and systems are also disclosed for performing any of the foregoing methods.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
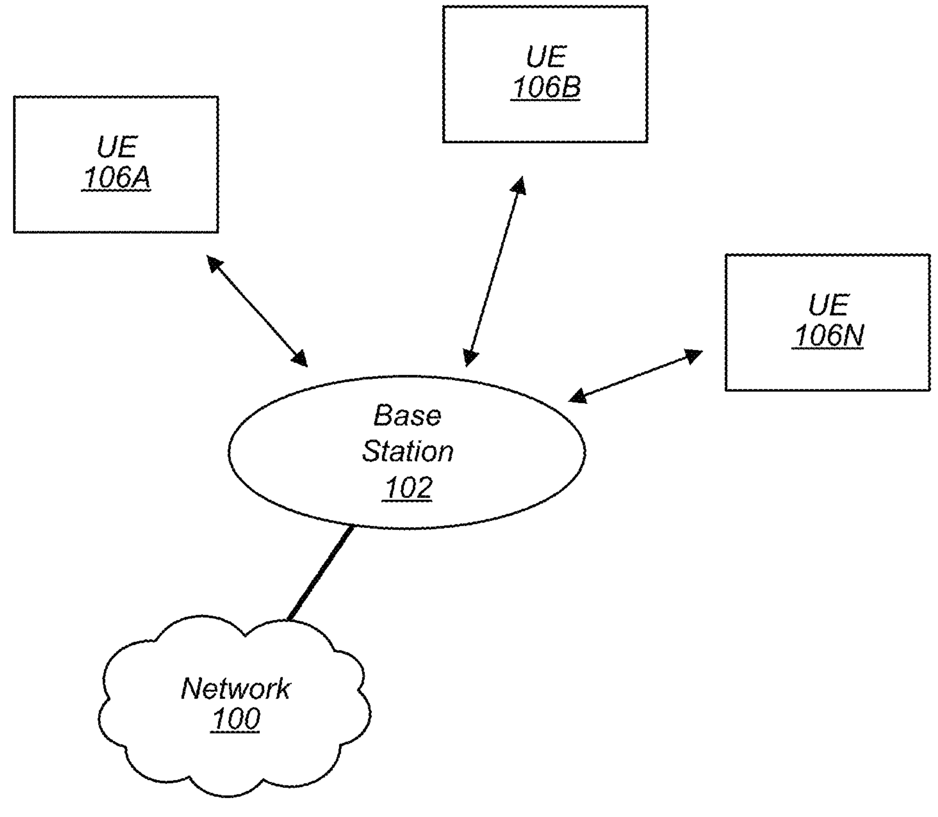
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

BS: Base Station
CN: Core Network
DL: Downlink
GPRS: General Packet Radio Service
GSM: Global System for Mobile Communication
GTP: GPRS Tunnelling Protocol
IE: Information Element
LTE: Long Term Evolution
MBS: Multicast and Broadcast Services
NR: New Radio
PDCP: Packet Data Convergence Protocol
PDU: Protocol Data Unit
PTM: Peer-To-Multiple
PTP: Peer-To-Peer
RACH: Random Access Channel
RAT: Radio Access Technology
RF: Radio Frequency
RX: Reception/Receive
TX: Transmission/Transmit
UE: User Equipment
UL: Uplink
UMTS: Universal Mobile Telecommunication System
UPF: User Plane Function

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
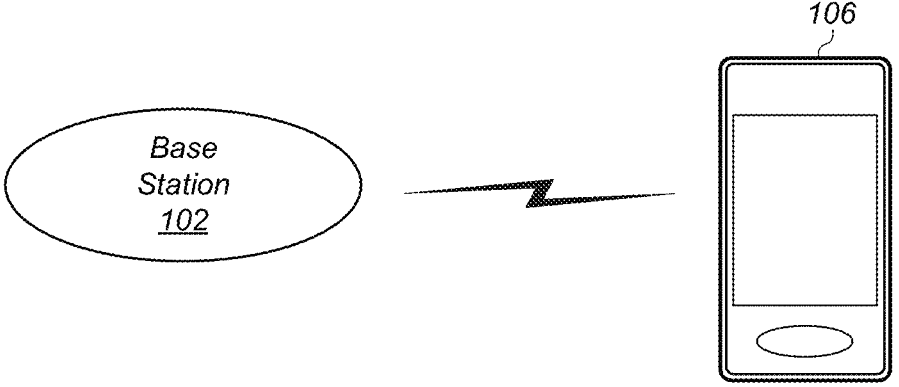
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, cHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for supporting service continuity during MBS handover, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
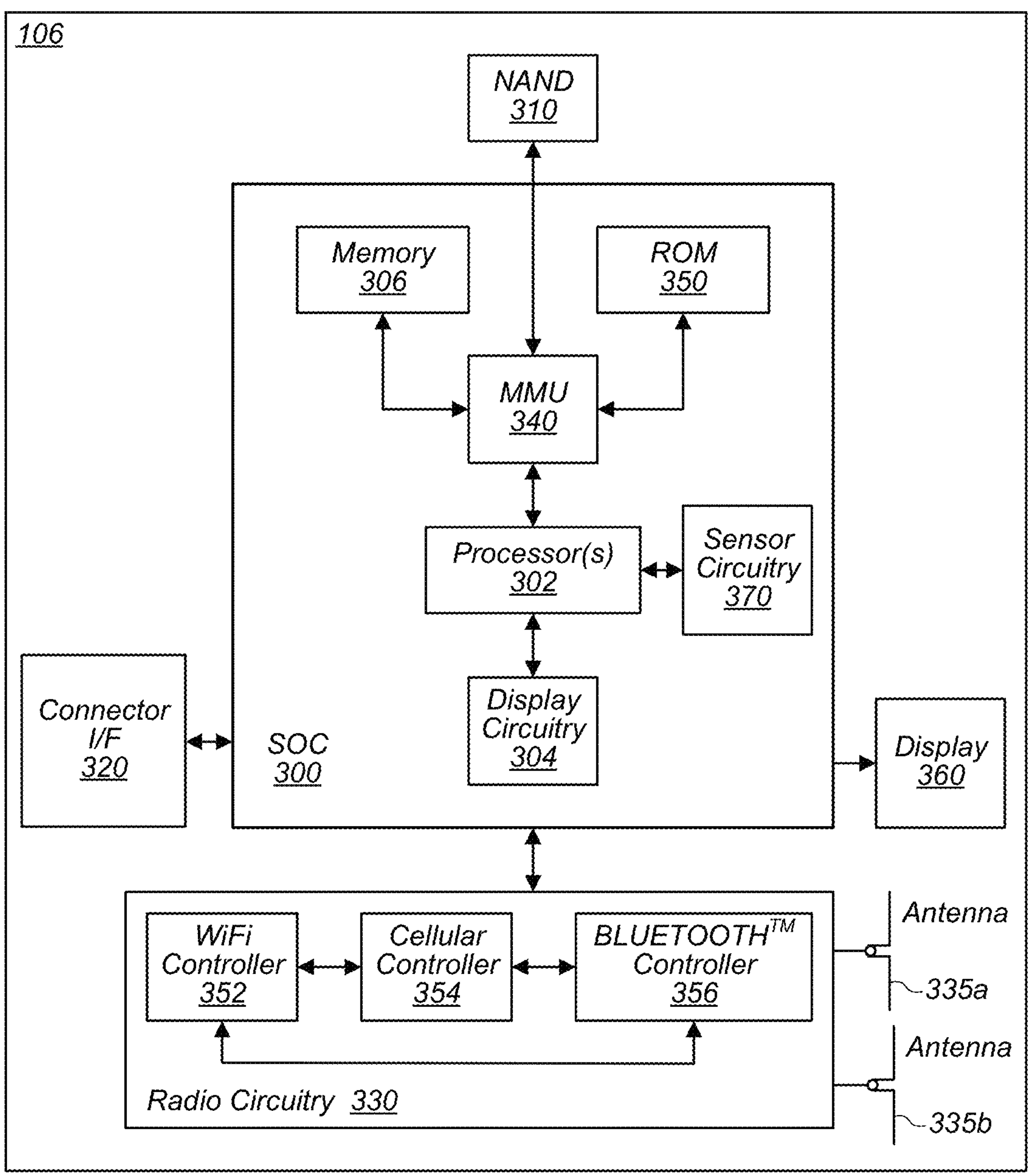
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and radio circuitry 330 (e.g., for LTE, LTE-A, NR, CDMA2000, BLUETOOTH™, Wi-Fi, GPS, UWB, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for supporting service continuity during Multicast and Broadcast Services (MBS) handover, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for supporting service continuity during MBS handover according to various embodiments disclosed herein. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 352, a cellular controller (e.g. LTE-A and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio circuitry 330, other embodiments have fewer or more similar controllers for various different RATs that may be implemented in UE device 106. In some embodiments, the cellular controller 354 may include a baseband processor configured to implement, or to cause the UE 106 to implement, one or more of the procedures disclosed herein, or a portion thereof.

Figure 4:
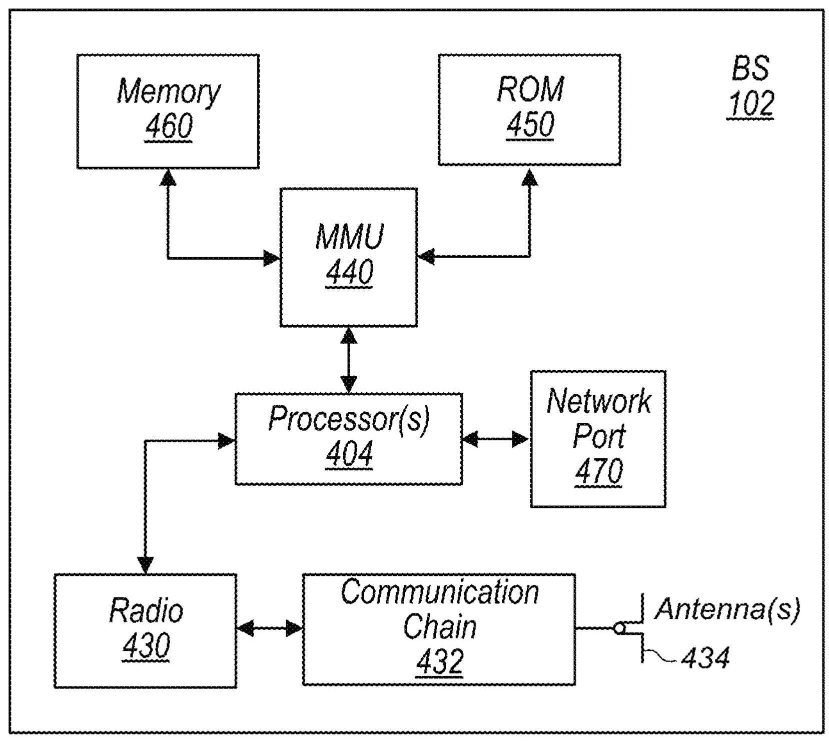
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

MBS Mobility with Service Continuity

As cellular spectrum usage increases in density, Multicast and Broadcast Services (MBS) are becoming a more popular solution to increase resource efficiency when a base station has information to communicate to a plurality of UEs. In some scenarios, UEs subscribing to an MBS session may be serviced by different base stations, and may travel between cells. In legacy systems, such as LTE, handover of MBS communications between cells may result in dropped and/or missed MBS packets. However, as MBS is becoming more common, there is a desire to improve reliability of MBS communications, which may be achieved in part through providing service continuity during handover.

Unicast communications represent an example of peer-to-peer (PTP) communications, e.g., directed from a base station, such as the base station 102 to a single UE, such as the UE 106. By contrast, MBS communications represent an example of peer-to-multiple (PTM) communications, e.g., with a base station, such as the base station 102, communicating with multiple UEs, such as the UEs 106A-106N. In some MBS scenarios, the base station 102 may broadcast a message to all UEs capable of receiving it. In other MBS scenarios, the base station 102 may multicast a communication by addressing the communication to a plurality or defined group of UEs, such as a group of UEs that are subscribed to the applicable MBS session.

Figure 5:
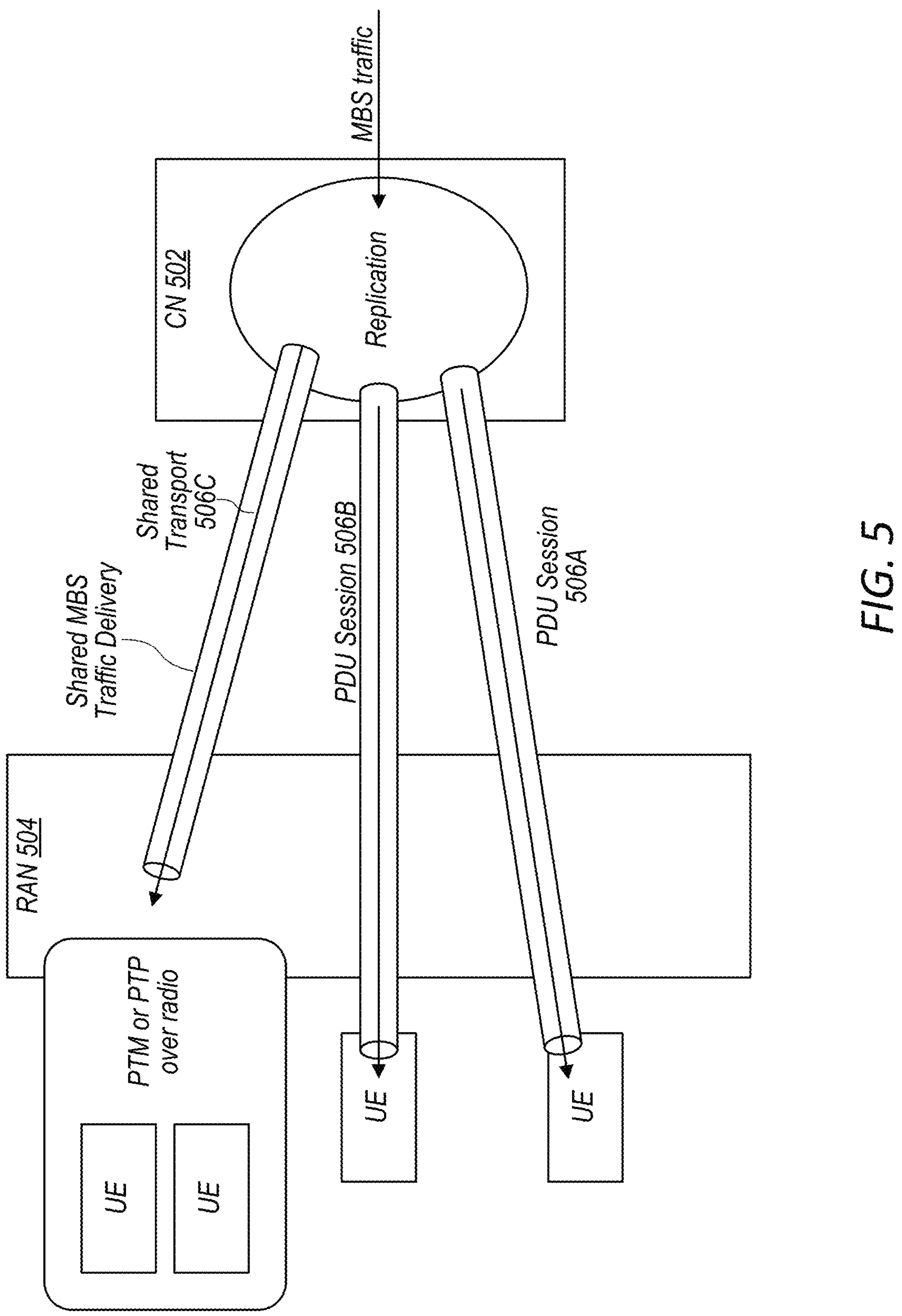
FIG. 5 illustrates a block diagram of an MBS architecture and delivery methods, according to some embodiments.

FIG. 5 illustrates a block diagram of an MBS architecture and delivery methods, e.g., as used in NR, according to some embodiments. As illustrated, the core network (CN) 502 of the wireless communication network (e.g., cellular provider network) may receive MBS traffic, e.g., from a content source. The CN 502 may replicate the MBS traffic for distribution to appropriate UEs; e.g., UEs subscribed to the MBS session to which the MBS traffic pertains. As illustrated, the replicated MBS traffic may be distributed via the RAN 504, which may include one or more base stations, such as the base station 102. In some instances, the MBS traffic may be distributed to a UE via a PTP communication, such as a traditional protocol data unit PDU session between the CN and the UE, such as the PDU sessions 506A and 506B. In other scenarios, the CN 502 may provide the MBS traffic via a shared transport 506C to the RAN 504 (e.g., to a base station of the RAN 504), to be delivered to a plurality of UEs. Upon receiving the MBS traffic via the shared transport, the base station may determine whether to deliver the MBS traffic via a plurality of PTP communications to the respective UEs, or via an MBS message to the plurality of UEs. The base station may make this determination based on, e.g., how many UEs should receive the MBS traffic, reception quality, and/or various other factors.

Handover procedures for MBS communications may leverage existing procedures for PTP communications, such as traditional PDU sessions. However, those existing procedures are insufficient in themselves, and must be improved to accommodate MBS communications.

Figure 6:
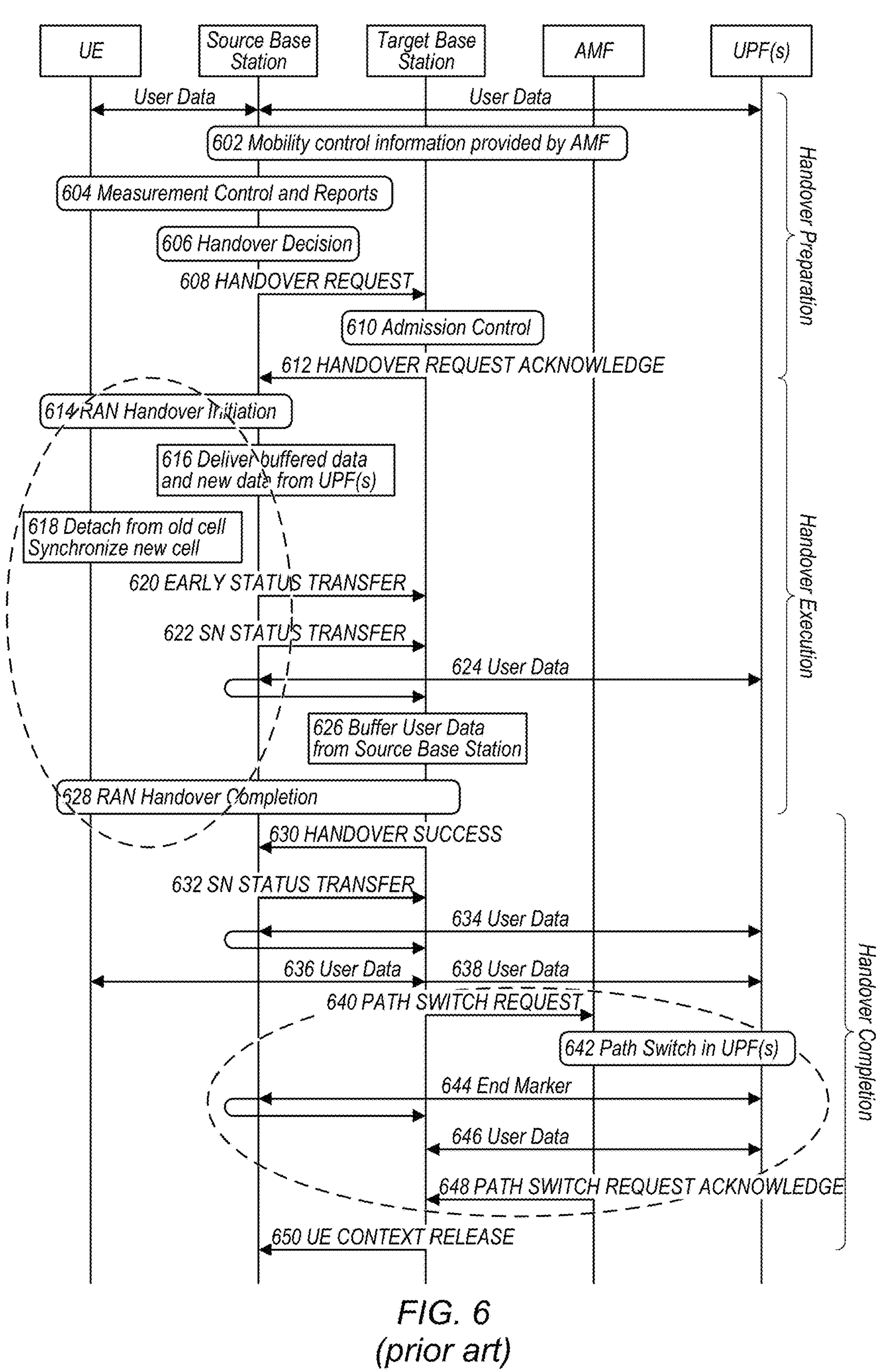
FIG. 6 illustrates a signal flow diagram for a traditional handover procedure, according to some embodiments.

FIG. 6 illustrates a signal flow diagram for a traditional unicast handover procedure, according to some embodiments. A detailed description of this procedure may be found in 3GPP TS 38.300 version 16.3.0, section 9.2.3.2, which is hereby incorporated by reference in its entirety, as if fully and completely set forth herein. A brief summary is as follows.

FIG. 6 illustrates signal flow between a UE (such as the UE 106), a source base station and a target base station (such as the base station 102), an access and mobility management function (AMF) of the core network, and one or more user plane functions (UPFs) of the core network.

Initially, the UE may be connected to the source base station, and may exchange user data therewith. On the network side, the source base station may also exchange the user data with the UPF.

At 602, the AMF may provide mobility control information to the source base station and/or the target base station.

At 604, the source base station and the UE may exchange messages pertaining to measurement control and reports.

At 606, the source base station may determine to initiate a handover the UE to the target base station.

At 608-612, the source base station and the target base station may conduct handover preparation. Specifically, as illustrated, at 608, the source base station may transmit to the target base station a handover request, e.g., over the Xn interface. In response, the target base station may, at 610, perform admission control, and may, at 612, transmit to the source base station a handover request acknowledge message. The handover request acknowledge message may include new RRC configuration.

At 614, the source base station and the UE may exchange one or more messages to initiate RAN handover. For example, the source base station may provide to the UE the new RRC configuration. The UE may respond at 618 by moving the RRC connection to the target base station. Upon completion of these steps, the UE may, at 628, provide to the target base station an indication that RAN handover is complete. For example, the UE may synchronize to the target base station and transmit an RRCReconfiguration-Complete message.

Meanwhile, at 616, the source base station may deliver buffered data and new data from the UPF(s). At 620, the source base station may transmit to the target base station an early status transfer message, e.g., for dedicated radio bearers (DRBs) configured with dual active protocol stacks (DAPS). At 622, the source base station may transmit to the target base station a sequence number (SN) status transfer message, e.g., for DRBs not configured with DAPS.

At 624, the source base station may receive user data for the UE, from the UPF(s), and may forward the user data to the target base station, while the handover is under way. At 626, the target base station may buffer the user data received from the source base station, until the handover is complete.

After the target base station receives the indication that RAN handover is complete at 628, the target base station may, at 630, transmit to the source base station a handover success message. The source base station may respond by transmitting a SN status transfer message, which may include information such as UL PDCP SN receiver status and DL PDCP SN transmitter status.

At 634, the source base station may continue to receive user data for the UE, from the UPF(s), and may forward the user data to the target base station. At this stage, because handover reconfiguration is complete at the UE, the target base station may, at 636, forward the user data to the UE, and receive user data from the UE. At 638, the target base station may pass user data from the UE to the UPF(s).

At 640, the target base station may transmit a path switch request message to the AMF, e.g., to trigger the core network to switch the DL data path towards the target base station and to establish an NG-C interface instance towards the target base station.

In response, the core network may, at 642, switch the DL data path towards the target base station. The UPF(s) may send one or more "end marker" packets on the old path to the source base station per PDU session/tunnel, and then may release any U-plane/TNL resources towards the source gNB. The source base station may forward the end marker packets to the target base station.

Thereafter, the target base station may receive user data for the UE directly from the UPF(s), as illustrated at 646.

At 648, the AMF may confirm the path switch request message of 640 with a path switch request acknowledge message. Upon reception of the path switch request acknowledge message from the AMF, the target base station may, at 650, send a UE context release message to inform the source base station about the success of the handover. The source base station can then release radio and C-plane related resources associated to the UE context. Any ongoing data forwarding may continue.

Two sections of this procedure may be particularly noteworthy in the current context. First, during basic handover execution, the UE may stop data transmission/reception to the network in the Uu interface from 614 through 628. The UE may then resume data transmission upon completion of the up-sync to the target cell via RACH procedure. However, during DAPS handover, the UE may continue data reception between the source and target cell in DL during the window of 614 through 628.

Second, as noted above, upon receiving the handover, the target base station may initiate a path switch at 640. Before path switching is finished, the CN forwards the UE-specific data to the source base station, which forwards the packets to the target base station via Xn interface. Upon the path switching completion, the CN may send the end marker to source base station and forward user data to the source base station. Upon receiving the end marker, the target base station may stop receiving the data from the source base station, and may regard all the data received directly from CN as being located after the data forwarded from the source base station.

For DRBs not configured with DAPS, the source base station may send the SN status transfer message 622 to the target base station to convey the uplink PDCP SN receiver status and the downlink PDCP SN transmitter status of DRBs for which PDCP status preservation applies (i.e., for RLC AM). The uplink PDCP SN receiver status may include at least the PDCP SN of the first missing UL PDCP SDU and may include a bit map of the receive status of the out of sequence UL PDCP SDUs that the UE needs to retransmit in the target cell, if any. The downlink PDCP SN transmitter status may indicate the next PDCP SN that the target base station shall assign to new PDCP SDUs, not having a PDCP SN yet. Notably, for each DRB, the UE may indicate both the UL and DL SN information to target cell/gNB.

Table 1 defines fields for SN STATUS TRANSFER (622), as defined by 3GPP TS 38.423 version 16.3.0, section 9.1.1.4:

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated for handover at the source NG-RAN node and for dual connectivity at the NG-RAN node from which the DRB context is transferred. | YES | reject |
| Target NG-RAN node UE XnAP ID | M | | NG-RAN node UE XnAP ID 9.2.3.16 | Allocated for handover at the target NG-RAN node and for dual connectivity at the NG-RAN | YES | reject |

TABLE 1-continued

| IE/Group Name | Presence | Range | IE type and reference | Semantics description | Criticality | Assigned Criticality |
|---|---|---|---|---|---|---|
| | | | | node to which the DRB context is transferred. | | |
| DRBs Subject To Status Transfer List | M | | 9.2.1.14 | | YES | ignore |

Table 2 defines fields for the information element (IE) "DRBs Subject To Status Transfer List", as shown in Table 1:

TABLE 2

| IE/Group Name | Presence | Range | IE type and reference | Semantics description | Criticality | Assigned Criticality |
|---|---|---|---|---|---|---|
| DRBs Subject To Status Transfer item | | 1 . . . <maxnoofDRBs> | | | — | |
| >DRB ID | M | | 9.2.3.33 | | — | |
| >CHOICE PDCP Status Transfer UL | M | | | | — | |
| >>12 bits | | | | | | |
| >>>Receive Status Of PDCP SDU | O | | BIT STRING (1 . . . 2048) | The IE is used in case of 12-bit long PDCP-SN. The first bit indicates the status of the SDU after the First Missing UL PDCP SDU. The Nth bit indicates the status of the UL PDCP SDU in position (N + First Missing SDU Number) modulo (1 + the maximum value of the PDCP-SN). 0: PDCP SDU has not been received. 1: PDCP SDU has been received correctly. | — | |
| >>>UL COUNT Value | M | | COUNT Value for PDCP SN Length 12 9.2.3.36 | PDCP-SN and Hyper Frame Number of the first missing UL SDU in case of 12-bit long PDCP-SN | — | |
| >>18 bits | | | | | | |
| >>>Receive Status Of PDCP SDU | O | | BIT STRING (1 . . . 131072) | The IE is used in case of 18-bit long PDCP-SN. The first bit indicates the status of the SDU after the First Missing UL PDCP SDU. The Nth bit indicates the status of the UL PDCP SDU in position (N + First Missing SDU Number) modulo (1 + the maximum value of the PDCP-SN). 0: PDCP SDU has not been received. 1: PDCP SDU has been received correctly. | — | |
| >>>UL COUNT Value | M | | COUNT Value for PDCP SN Length 18 9.2.3.37 | PDCP-SN and Hyper Frame Number of the first missing UL SDU in case of 18-bit long PDCP-SN | — | |

TABLE 2-continued

| IE/Group Name | Presence | Range | IE type and reference | Semantics description | Criticality | Assigned Criticality |
|---|---|---|---|---|---|---|
| >CHOICE PDCP Status Transfer DL | M | | | | — | |
| >>12 bits | | | | | | |
| >>>DL COUNT Value | M | | COUNT Value for PDCP SN Length 12 9.2.3.36 | PDCP-SN and Hyper Frame Number that the target NG-RAN node (handover) or the NG-RAN node to which the DRB context is transferred (dual connectivity) should assign for the next DL SDU not having an SN yet in case of 12-bit long PDCP-SN. | — | |
| >>18 bits | | | | | | |
| >>>DL COUNT Value | M | | COUNT Value for PDCP SN Length 18 9.2.3.37 | PDCP-SN and Hyper Frame Number that the target NG-RAN node (handover) or the NG-RAN node to which the DRB context is transferred (dual connectivity) should assign for the next DL SDU not having an SN yet in case of 18-bit long PDCP-SN. | — | |
| >Old QoS Flow List - UL End Marker expected | O | | QoS Flow List 9.2.1.4a | This IE is included to be used for indicating that the source NG-RAN node has initiated QoS flow re-mapping and has not yet received SDAP end markers, as described in TS 38.300 [8]. | YES | reject |

Figure 7:
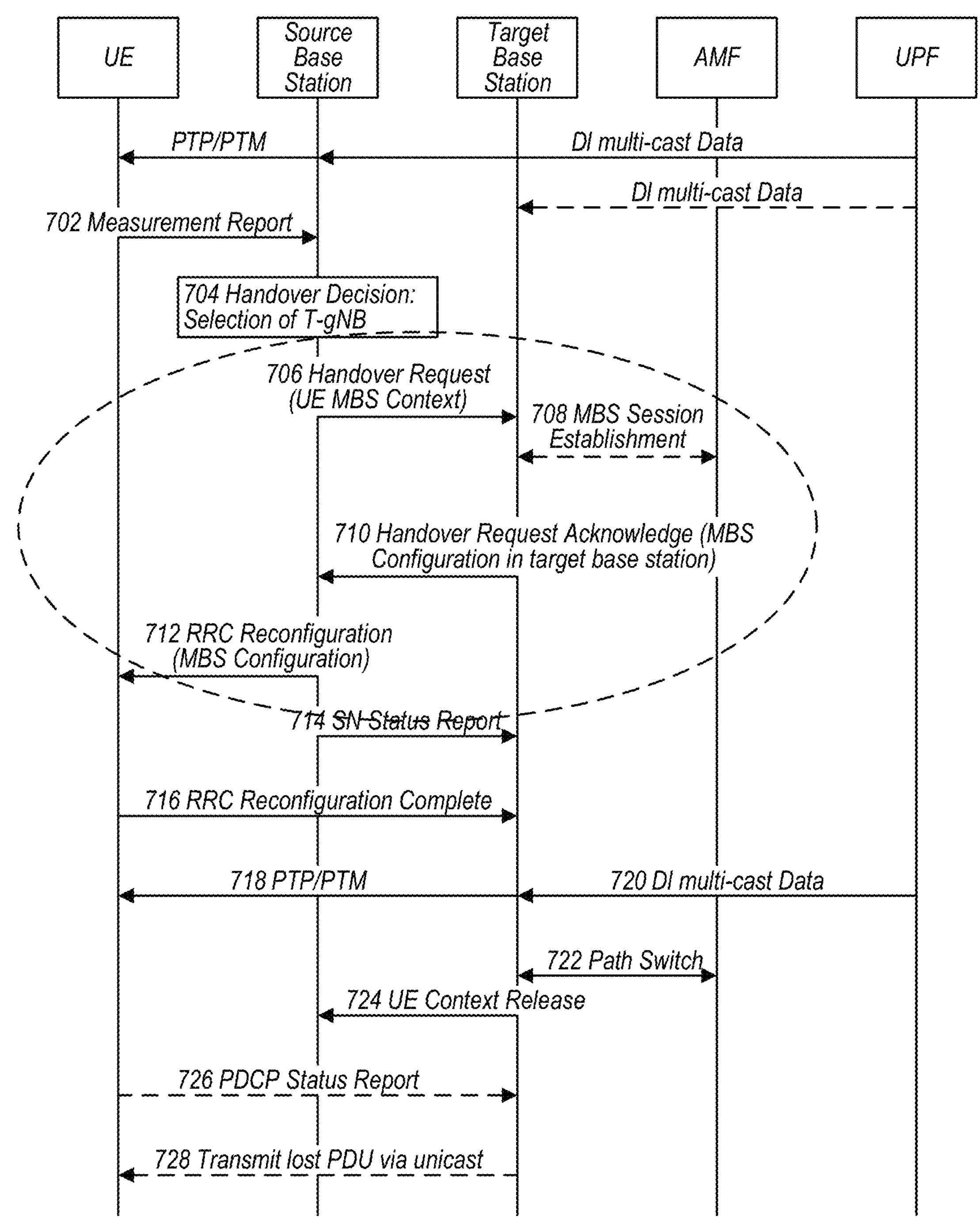
FIG. 7 illustrates a signal flow diagram for a traditional MBS handover procedure, according to some embodiments.

FIG. 7 illustrates a signal flow diagram for a traditional MBS handover procedure, according to some embodiments. FIG. 7 illustrates signal flow between a UE (such as the UE 106), a source base station and a target base station (such as the base station 102), an AMF of the core network, and one or more UPF(s) of the core network.

Initially, the UE may be connected to the source base station, and may receive MBS data therefrom, either as PTP or PTM transmissions. On the network side, the source base station may receive MBS multicast data from the UPF(s). As illustrated, in some scenarios, the target base station may also receive the MBS multicast data from the UPF(s).

At 702, the UE may transmit a measurement report to the source base station. In response, the source base station may, at 704, determine to initiate an MBS handover to the target base station.

At 706-710, the source base station and the target base station may conduct MBS handover preparation. Specifically, as illustrated, at 706, the source base station may transmit to the target base station a handover request, which may include MBS context for the UE, such as information about the MBS session(s) to which the UE is subscribed. In response, if the target base station currently has no corresponding MBS session established with the CN, the target base station may, at 708, establish an MBS session via the AMF. At 710, the target base station may transmit to the source base station a handover request acknowledge message, which may include MBS configuration information regarding the target base station.

At 712, the source base station may forward to the UE an RRC reconfiguration message, including the MBS configuration information. The source base station may also, at 714, transmit to the target base station a SN status report message.

In response to the RRC reconfiguration message at 712, the UE may move the RRC connection to the target base station, and may, at 716, provide to the target base station an indication that RAN handover is complete. For example, the UE may synchronize to the target base station and transmit an RRCReconfigurationComplete message.

At that point, the target base station may, at 718, begin transmission of MBS data to the UE, either as PTP or PTM transmissions. The target base station may receive the BMS multicast data from the UPF(s), as illustrated at 720.

After the target base station receives the indication that RAN handover is complete at 716, the target base station may, at 722, negotiate a path switch procedure with the AMF, e.g., to trigger the core network to switch the DL data path towards the target base station and to establish an NG-C interface instance towards the target base station. This path switch procedure may include steps similar to those illustrated at 640-648 of FIG. 6.

Upon completion of the path switch procedure, the target base station may, at 724, send a UE context release message to inform the source base station about the success of the handover. The source base station can then release resources associated to the UE context.

In some scenarios, the source base station may continue to transmit MBS communications for the UE until handover is complete, e.g., at 716 or 724. However, similar to the scenario illustrated in FIG. 6, the UE may stop receiving the MBS communications from the source base station upon receiving the RRC reconfiguration message at 712.

At 726, the UE may transmit to the target base station a PDCP status report, e.g., indicating any PDU(s) lost during PTP/PTM transmission at 718. In response, the target base station may, at 728, retransmit to the UE any lost PDU(s) via a unicast (PTP) message. However, the procedure of FIG. 7 does not include provisions for identifying or retransmitting, via the target base station, any PDU(s) lost prior to 712. The procedure of FIG. 7 also does not include provisions for identifying or retransmitting, via the target base station, any PDU(s) missed during handover.

Figure 8:
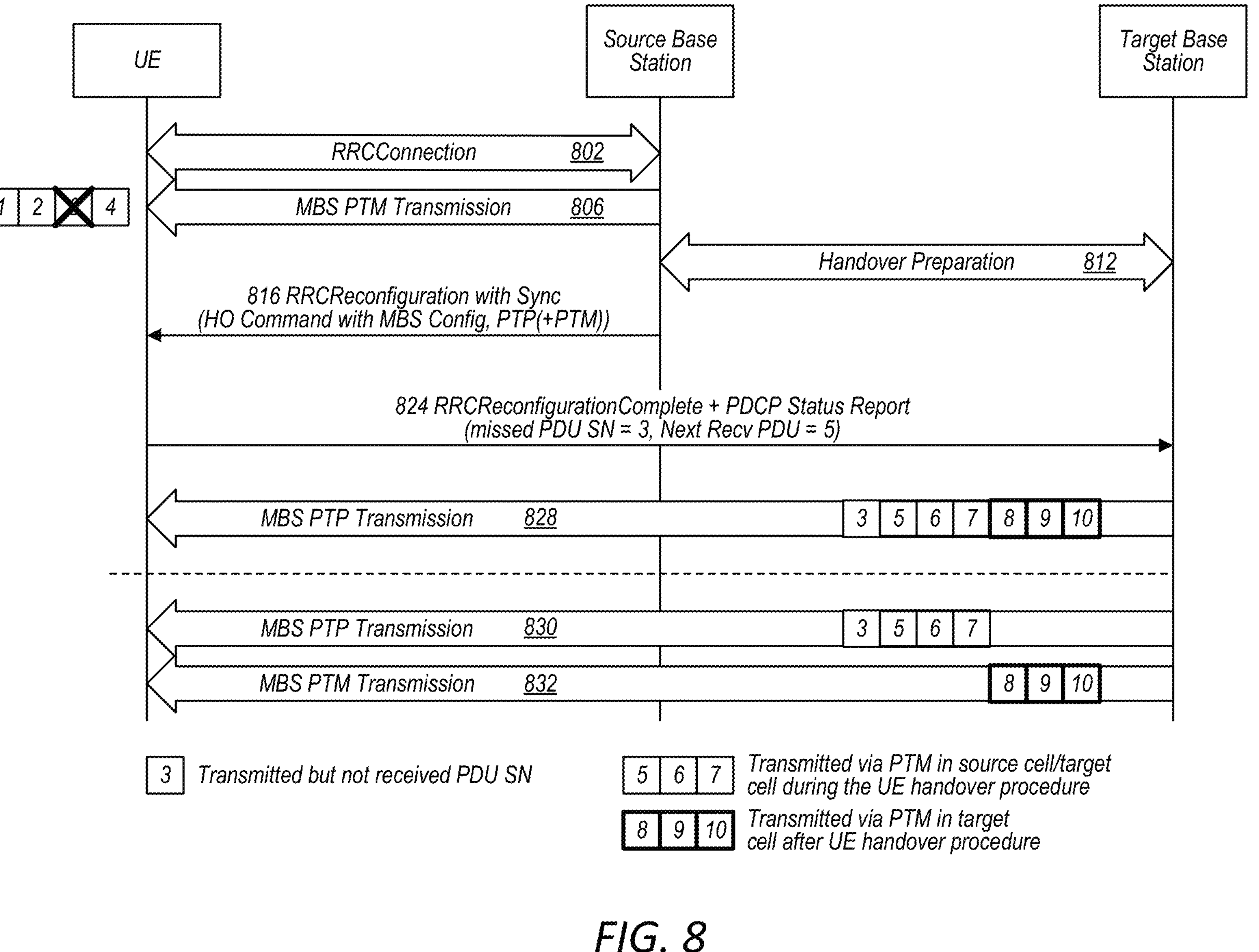
FIG. 8 illustrates a signal flow diagram for lossless handover for MBS transmission, according to some embodiments.

FIG. 8—Lossless Handover for MBS Transmission

FIG. 8 illustrates a signal flow diagram for lossless handover for MBS transmission, according to some embodiments. Specifically, in the example scenario of FIG. 8, the NW performs retransmission of missing MBS packets in the target cell via PTP communications. New data transmissions for the same MBS session/MBS DRB in the target cell may be transmitted via either PTM or PTP communications. The PDU information for retransmission may be based on UE PDCU status report after UE accesses to the target cell. FIG. 8 illustrates a specific scenario of an MBS handover procedure, similar to the procedure illustrated in FIG. 7.

It should be appreciated that portions of the signal flow have been simplified in FIG. 8, to more clearly focus on the details relevant to the present example. However, in some implementations, a broad arrow shown in FIG. 8 may represent a plurality of communications, e.g., similar to a plurality of communications illustrated at a similar point in FIG. 7.

FIG. 8 illustrates signal flow between a UE (such as the UE 106), and a source base station and a target base station (such as the base station 102).

As illustrated in FIG. 8, the UE may, at 802, establish an RRC connection with the source base station. At 806, the source base station may transmit to the UE (and to other UEs that are subscribed to the MBS session) one or more MBS PTM communications for an MBS session. Specifically, in the example of FIG. 8, the MBS PTM communications may include 4 PDUs, with sequence numbers 1-4. In this example, PDUs 1, 2, and 4 are received successfully, but PDU 3 is dropped (e.g., due to interference, insufficient signal strength, etc.).

At 812, the source base station and the target base station may perform MBS handover preparation. In some scenarios, this may include steps similar to 706-710 of FIG. 7.

At 816, the source base station may transmit to the UE an RRC reconfiguration message, with synchronization parameters. For example, the RRC reconfiguration message may include a handover command, and may further include configuration information pertaining to PTP and/or PTM communication.

In response to the RRC reconfiguration message at 816, the UE may move the RRC connection to the target base station, and may, at 824, transmit to the target base station an indication that RAN handover is complete. For example, the UE may synchronize to the target base station and transmit an RRCReconfigurationComplete message. Because the UE moves the RRC connection to the target base station, the UE may stop receiving MBS communications from the source base station in response to the RRC reconfiguration message at 816.

The transmission at 824 may also include a PDCP status report. For example, the PDCP status report may include a SN (e.g., a DL PDCP SN) or other indication of any dropped or missed PDU(s) of the MBS session, such as PDU 3 in the scenario of FIG. 8. As another example, the PDCP status report may include a SN or other indication of a next PDU of the MBS session to be received by the UE, such as PDU 5 in the scenario of FIG. 8. For example, the PDCP status report may include the SN immediately following the SN of the last PDU of the MBS session that was received by the UE prior to 816 (e.g., PDU 4).

Once RRC reconfiguration is complete at the UE, the target base station may begin transmitting to the UE communications for the MBS session. FIG. 8 illustrates two possible scenarios, one illustrated by 828 and the other illustrated by 830-832.

As illustrated at 828, the target base station may transmit to the UE one or more PTP communications for the MBS session. The PTP communications may include any dropped PDUs identified by the UE at 824. The PTP communications may also include the next PDU of the MBS session, as identified by the UE at 824, along with subsequent PDUs that were transmitted by the source base station during handover—i.e., PDUs not received by the UE because they were transmitted by the source base station after 816. The PTP communications may also include subsequent PDUs of the MBS session, received by the target base station from the core network.

In the second example, the target base station may provide ongoing support for the MBS session using PTM communications. As illustrated at 830, the target base station may first transmit to the UE one or more PTP communications for the MBS session, including any dropped PDUs identified by the UE at 824, along with the next PDU of the MBS session and subsequent PDUs that were transmitted by the source base station during handover, just as in the scenario of 828. However, at 832, the target base station may transmit to the UE (and to other UEs that are subscribed to the MBS session) subsequent PDUs of the MBS session via PTM transmissions.

In some implementations, the target base station may dynamically decide whether to transmit the ongoing PDUs of the MBS session via PTP communications, according to the scenario of 828, or via PTM communications, according to the scenario of 832. For example, if the UE illustrated in FIG. 8 is the only UE (or one of a small number of UEs) that is receiving the MBS session in the target cell, then the target base station may decide to transmit the MBS PDUs via PTP communications. However, if several UEs in the target cell are receiving the MBS session, then the target base station may decide to transmit the MBS PDUs to those several UEs via PTM communications. However, in either case, the PDUs dropped by the UE illustrated in FIG. 8, along with the PDUs missed by that UE during handover, should be retransmitted only to that UE, rather than to all UEs of the target cell that are receiving the MBS session. Therefore, those PDUs may be transmitted via PTP transmission in both the scenario of 828, and the scenario of 830.

Figure 9:
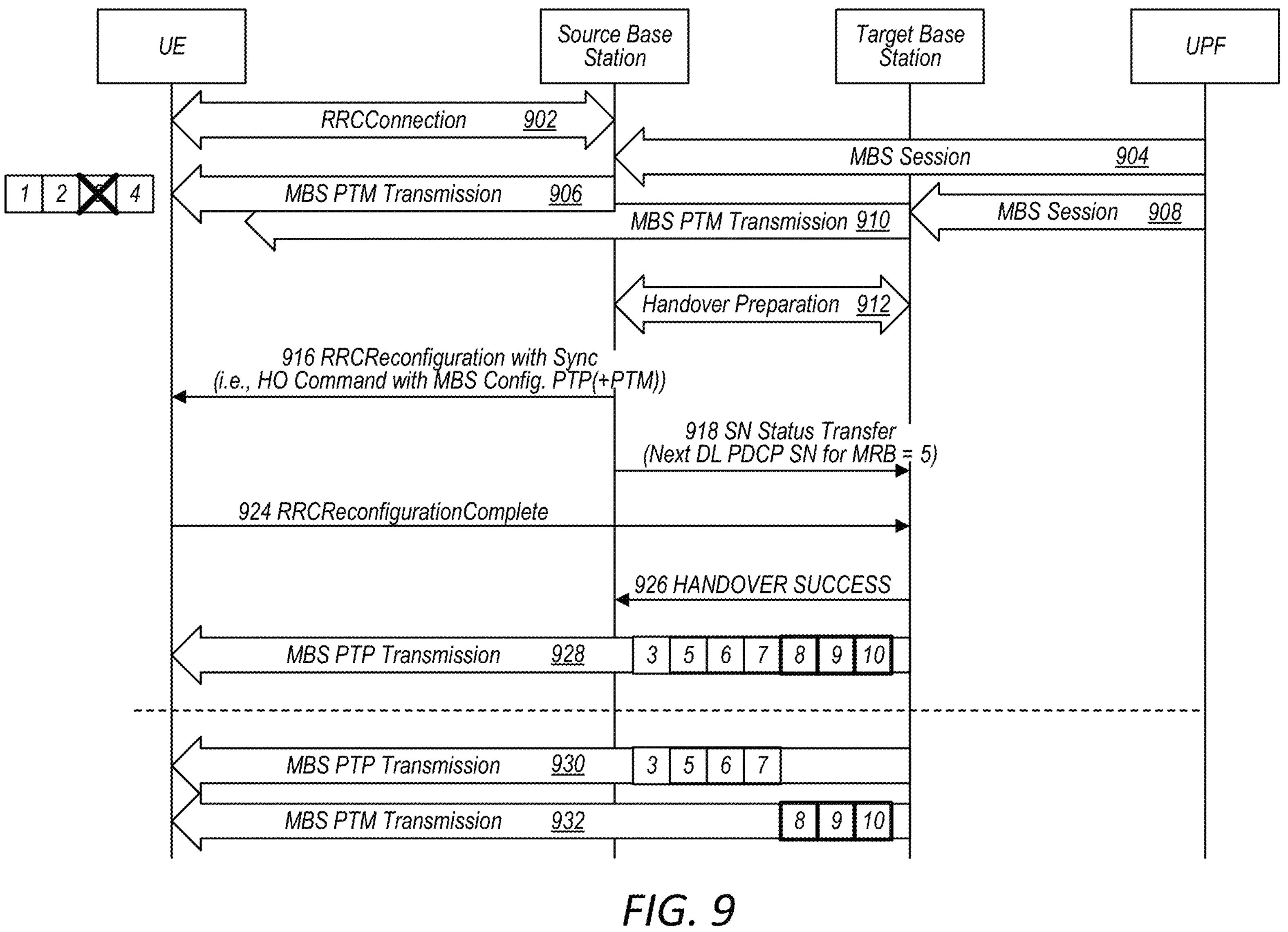
FIG. 9 illustrates a signal flow diagram for data forwarding from a source base station to a target base station during MBS handover, for an MBS session previously enabled on both base stations, according to some embodiments.

FIG. 9—Data Forwarding from Source to Target gNB Configured with MBS Session FIG. 9 illustrates a signal flow diagram for data forwarding from a source base station to a target base station during MBS handover, for an MBS session previously enabled on both base stations, according to some embodiments. FIG. 9 illustrates signal flow between a UE (such as the UE 106), a source base station and a target base station (such as the base station 102), and one or more UPF(s) of the core network. Specifically, the procedure of FIG. 9 illustrates an example in which the same MBS session is configured and enabled in both the source base station and the target base station, according to some embodiments.

As illustrated in FIG. 9, the UE may, at 902, establish an RRC connection with the source base station. At 904, the source base station may receive, from the UPF, data of an MBS session. For example, the data may include the data that will be transmitted by the source base station as PDUs 1-4, 1-7, or 1-10. In some scenarios, the source base station may receive additional data of the MBS session at other times throughout the procedure of FIG. 9.

At 906, the source base station may transmit to the UE (and to other UEs that are subscribed to the MBS session) one or more MBS PTM communications including at least a portion of the data for the MBS session received at 904. Specifically, in the example of FIG. 9, the MBS PTM communications may include 4 PDUs, with sequence numbers 1-4. In this example, PDUs 1, 2, and 4 are received successfully, but PDU 3 is dropped.

In the scenario of FIG. 9, the MBS session is also configured and enabled in the target base station. Thus, the target base station may also receive, at 908, the data of the MBS session. In some scenarios, the data received by the target base station at 908 may be the same as the data received by the source base station at 904. However, some aspects, such as UE addressing, etc., may differ between 904 and 908. At 910, the target base station may transmit, to subscribing UEs of the target cell, at least a portion of the data received at 908.

At 912, the source base station and the target base station may perform MBS handover preparation. In some scenarios, this may include steps similar to 706-710 of FIG. 7. However, it should be noted that, because the MBS session is already configured and enabled in the target base station, MBS session establishment (like that shown at 708) is not necessary, and may be omitted (may not be performed).

At 916, the source base station may transmit to the UE an RRC reconfiguration message, with synchronization parameters. For example, the RRC reconfiguration message may include a handover command and MBS configuration information. In some scenarios, the RRC reconfiguration message at 916 may be similar or equivalent to the RRC reconfiguration message of 816.

At 918, the source base station may transmit to the target base station a SN status transfer message. For example, the SN status transfer message may include a SN or other indication of a next PDU of the MBS session to be received by the UE, such as PDU 5 in the scenario of FIG. 9. For example, the PDCP status report may include the SN immediately following the SN of the last PDU of the MBS session that was received by the UE prior to 916 (e.g., PDU 4).

In response to the RRC reconfiguration message at 916, the UE may move the RRC connection to the target base station, and may, at 924, transmit to the target base station an indication that RAN handover is complete. For example, the UE may synchronize to the target base station and transmit an RRCReconfigurationComplete message. Because the UE moves the RRC connection to the target base station, the UE may stop receiving MBS communications from the source base station in response to the RRC reconfiguration message at 916.

The transmission at 924 may also include a PDCP status report. For example, the PDCP status report may include a SN or other indication of any dropped or missed PDU(s) of the MBS session, such as PDU 3 in the scenario of FIG. 9.

At 926, the target base station may transmit to the source base station a handover success message. In some scenarios, the handover success message may be similar to the handover success message 630 of FIG. 6.

Once RRC reconfiguration is complete at the UE, the target base station may begin transmitting to the UE communications for the MBS session. FIG. 9 illustrates the same two possible scenarios as FIG. 8; one illustrated by 928, which is equivalent to 828, and the other illustrated by 930-932, which are equivalent to 830-832.

It should be noted that, because the MBS session was configured and enabled prior to the start of handover, there is no need for the source base station to forward the MBS data to the target base station. Instead, the target base station may transmit or retransmit to the UE any of the MBS PDUs 3, 5-10 based on the data received from the UPF at 908. Similarly, there is no need to perform a path switch procedure, such as that illustrated at 722 of FIG. 7.

Figure 10:
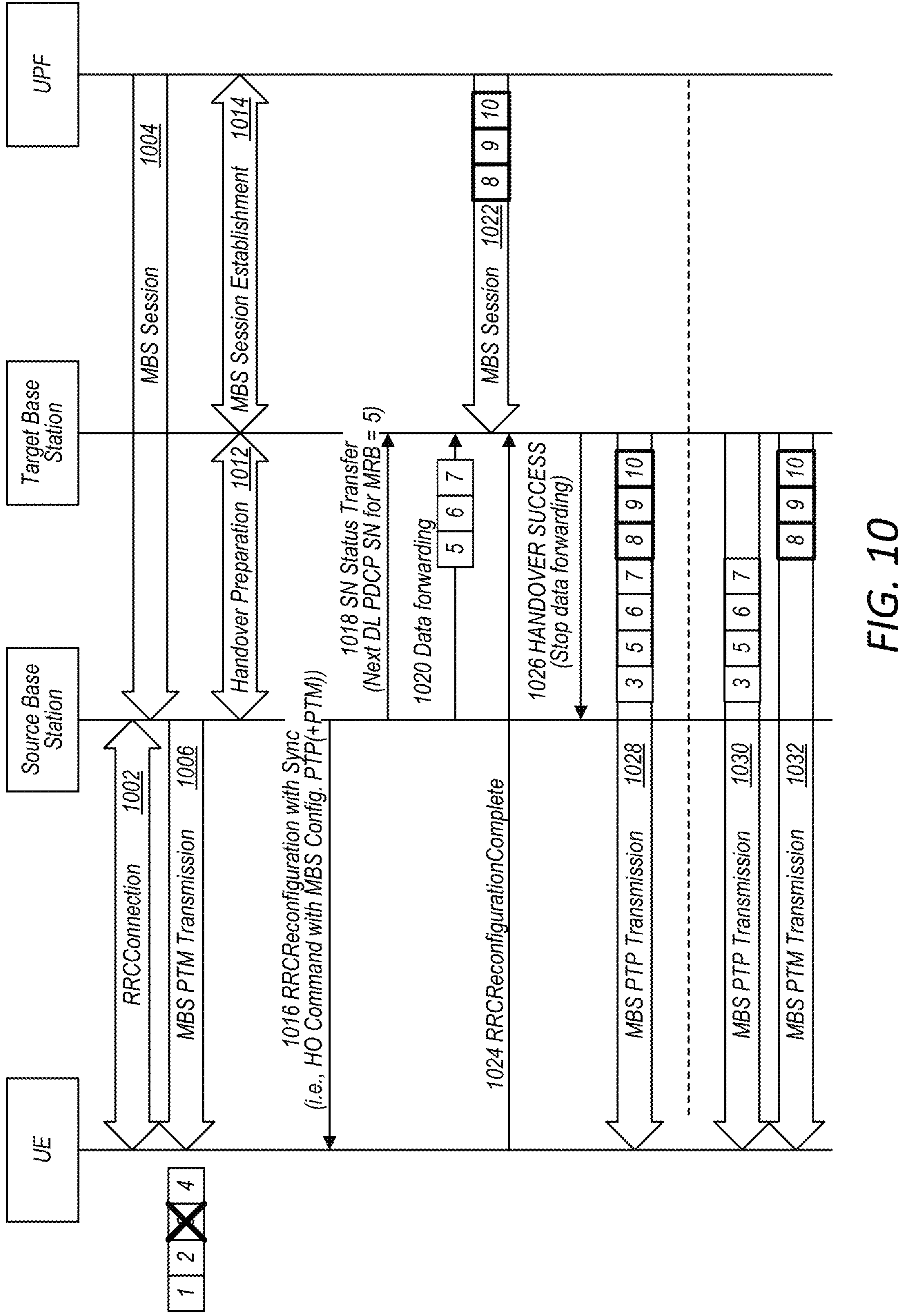
FIG. 10 illustrates a signal flow diagram for data forwarding from a source base station to a target base station during MBS handover, for an MBS session not previously enabled on the target base station, according to some embodiments.

FIG. 10—Data Forwarding from Source to Target gNB Not Configured with MBS Session FIG. 10 illustrates a signal flow diagram for data forwarding from a source base station to a target base station during MBS handover, for an MBS session not previously enabled on the target base station, according to some embodiments. FIG. 10 illustrates signal flow between a UE (such as the UE 106), a source base station and a target base station (such as the base station 102), and one or more UPF(s) of the core network. Specifically, the procedure of FIG. 10 illustrates an example in which the MBS session to which the UE is subscribed in the source cell is not configured and enabled in the target base station, according to some embodiments.

As illustrated in FIG. 10, the UE may, at 1002, establish an RRC connection with the source base station. At 1004, the source base station may receive, from the UPF, data of an MBS session. For example, the data may include the data that will be transmitted by the source base station as PDUs 1-4, 1-7. In some scenarios, the source base station may receive additional data of the MBS session at other times throughout the procedure of FIG. 10.

At 1006, the source base station may transmit to the UE (and to other UEs that are subscribed to the MBS session) one or more MBS PTM communications including at least a portion of the data for the MBS session received at 1004. Specifically, in the example of FIG. 10, the MBS PTM communications may include 4 PDUs, with sequence numbers 1-4. In this example, PDUs 1, 2, and 4 are received successfully, but PDU 3 is dropped.

In some scenarios, the signals illustrated at 1002-1006 may be similar or identical to those illustrated at 902-906 of FIG. 9. However, in the scenario of FIG. 10, the MBS session is not configured or enabled in the target base station.

At 1012, the source base station and the target base station may perform MBS handover preparation. In some scenarios, this may include steps similar to 706-710 of FIG. 7. Specifically, because the MBS session is not yet configured and enabled in the target base station, MBS session establishment (like that shown at 708) may be performed, e.g., in response to a handover request message, such as that illustrated at 706.

At 1016, the source base station may transmit to the UE an RRC reconfiguration message, with synchronization parameters. For example, the RRC reconfiguration message may include a handover command and MBS configuration information. In some scenarios, the RRC reconfiguration message at 1016 may be similar or equivalent to the RRC reconfiguration message of 816.

At 1018, the source base station may transmit to the target base station a SN status transfer message. For example, the SN status transfer message may include a SN or other indication of a next PDU of the MBS session to be received by the UE, such as PDU 5 in the scenario of FIG. 10. For example, the PDCP status report may include the SN immediately following the SN of the last PDU of the MBS session that was received by the UE prior to 1016 (e.g., PDU 4).

As noted in previous examples, these PDUs may be retransmitted to the UE following completion of the handover, because, in response to the RRC reconfiguration message at 1016, the UE may stop receiving transmissions from the source base station, and move the RRC connection to the target base station. However, because the MBS session establishment was performed during handover preparation, the target base station did not receive from the UPF the MBS data transmitted prior to that point, such as the PDUs 1-7. Therefore, at 1020, the source base station may forward to the target base station any MBS PDUs (or applicable MBS data) transmitted by the source base station subsequent to the RRC reconfiguration message at 1016, such as the PDUs 5-7 in the example of FIG. 10.

Additionally, at 1022, the target base station may receive, from the UPF, subsequent data for the MBS session, such as the PDUs 8-10 in the example of FIG. 10. The UPF may transmit the data at least partly in response to the MBS session establishment at 1014.

Once RRC reconfiguration is complete at the UE, the UE may, at 1024, transmit to the target base station an indication that RAN handover is complete. For example, the UE may synchronize to the target base station and transmit an RRCReconfigurationComplete message.

The transmission at 1024 may also include a PDCP status report. For example, the PDCP status report may include a SN or other indication of any dropped or missed PDU(s) of the MBS session, such as PDU 3 in the scenario of FIG. 10.

At 1026, the target base station may transmit to the source base station a handover success message. In some scenarios, the handover success message may be similar to the handover success message 630 of FIG. 6. In some scenarios, the handover success message 1026 may include an instruction or indication for the source base station to stop forwarding MBS data. The handover success message may be at least partly in response to the RRC reconfiguration complete message 1024 and may also be at least partly in response to receiving the data for the MBS session at 1022.

Once RRC reconfiguration is complete at the UE, the target base station may begin transmitting to the UE communications for the MBS session. FIG. 10 illustrates the same two possible scenarios as FIG. 8; one illustrated by 1028, which is equivalent to 828, and the other illustrated by 1030-1032, which are equivalent to 830-832.

PDCP SN Synchronization

In each of the examples of FIGS. 8-10, the source base station may communicate to the target base station a SN (e.g., the DL PDCP SN) of any dropped packets and/or of the next MBS PDU to be transmitted to the UE. In order for the SNs provided by the source base station to be meaningful to the target base station, the source base station may synchronize PDCP SN allocation with the target base station. This may be accomplished by configuring each base station to allocate a PDCP SN to each PDU based on information received from the UPF, e.g., during MBS session establishment, or in an MBS session data transmission.

As a first example, when transmitting a PDU carrying MBS data, the base station may allocate a PDCP SN according to a SN in the MBS packet in which the MBS data was received from the UPF. For example, the base station may set the PDCP SN to be equal to (or based on) the PDU header of the MBS packet. Alternatively, the base station may set the PDCP SN to be equal to (or based on) the GTP-U header of the MBS packet. In either example, the UPF may use the same SN for transmitting a given MBS packet to both the source base station and the target base station. As a result, the source base station and the target base station will allocate the same PDCP SN for that packet, such that the source base station may identify that packet to the target base station by reference to its PDCP SN.

As another example, the base station may allocate the PDCP SN according to the received packet order, e.g., by sequentially increasing SNs. In some scenarios, the UPF may provide a start number for each base station. For example, the UPF may indicate to the source base station a PDCP SN to be used for the first MBS packet to be transmitted to the source base station in an MBS session. The PDCP SN may be indicated, e.g., during MBS session establishment, or in a header (e.g., in a spare field of the PDU header) of the first MBS packet transmitted to the source base station in an MBS session. Both the UPF and the source base station may then increment the PDCP SN for each subsequent PDU. Similarly, the UPF may indicate to the target base station a PDCP SN to be used for the first MBS packet to be transmitted to the target base station, wherein the PDCP SN to be used is consistent with the PDCP SN numbering indicated to the source gNB; e.g., the PDCP SN to be used is the PDCP SN resulting from subsequently numbering the PDUs since the first MBS packet transmitted to the source base station in an MBS session. As a result, the target base station will allocate the PDCP SN specified by the UPF, which will be the same as the PDCP SN allocated to that packet by the source base station, based on sequential number of the PDUs. Following the first PDU, the target base station will also increment the PDCP SN for each subsequent PDU. Once again, the source base station may identify each packet to the target base station by reference to its PDCP SN.

Specific Examples

The following are specific examples of implementations consistent with the foregoing description. Other examples, different are also envisioned, within the full scope of the foregoing description.

1. In some embodiments, a method of performing communications of a Multicast and Broadcast Services (MBS) session includes a target base station of a wireless communication network receiving, from a remote base station of the wireless communication network, a request to initiate a handover of the MBS session for a user equipment (UE) from the source base station to the target base station; receiving an indication of a next protocol data unit (PDU) of the MBS session to be received by the UE; and transmitting to the UE a peer-to-peer (PTP) message including the next PDU of the MBS session, wherein the next PDU of the MBS session was previously transmitted by the source base station via a peer-to-multiple (PTM) message after the request to initiate the handover.
2. In some embodiments according to example 1, the method further includes: receiving from the UE an indication of a dropped PDU of the MBS session, wherein the dropped PDU was transmitted by the source base station, but was not properly received by the UE; and transmitting to the UE a peer-to-peer message including the dropped PDU.

3. In some embodiments according to example 2, the indication of the next PDU and the indication of the dropped PDU are received from the UE in a Packet Data Convergence Protocol (PDCP) status report.
4. In some embodiments according to example 1, the indication of the next PDU is received from the source base station.
5. In some embodiments according to any of examples 1-4, the method further includes: determining whether to transmit subsequent PDUs of the MBS session via peer-to-peer messages or via peer-to-multiple messages, based at least in part on a number of UEs serviced by the target base station that are subscribed to the MBS session.
6. In some embodiments according to any of examples 1-5, the method further includes: in response to receiving the request to initiate the handover, establishing the MBS session with a core network element of the wireless communication network; receiving, from the source base station, at least one PDU of the MBS session to be forwarded to the UE, the at least one PDU including the next PDU of the MBS session; and subsequent to receiving the next PDU, receiving, from the core network element, a subsequent PDU of the MBS session.
7. In some embodiments according to example 6, the method further includes: receiving from the UE an indication that MBS handover reconfiguration at the UE is complete; and in response to receiving the indication that MBS handover reconfiguration at the UE is complete, and subsequent to establishing the MBS session with the core network element, providing to the source base station an instruction to stop forwarding PDUs of the MBS session.
8. In some embodiments according to example 7, the method further includes: forwarding to the UE, via at least one PTP message, each PDU of the at least one PDU of the MBS session received from the source base station prior to receiving the indication that MBS handover reconfiguration at the UE is complete.
9. In some embodiments according to any of examples 1-5, the method further includes: establishing, with a core network element of the wireless communication network, the MBS session, wherein the MBS session is established before receiving the request to initiate the handover.
10. In some embodiments according to any of examples 1-9, the method further includes: receiving, from a core network element of the wireless communication network, an indication of a sequence number to be allocated to a specified PDU of the MBS session; and allocating sequential sequence numbers to PDUs subsequent to the specified PDU.
11. In some embodiments according to any of examples 1-9: receiving, from a core network element of the wireless communication network, an MBS packet including MBS payload data for the MBS session, the MBS packet having a packet sequence number; and transmitting to the UE a packet including the MBS payload data, wherein the packet sequence number of the MBS packet is used as a downlink (DL) Packet Data Convergence Protocol (PDCP) sequence number of the transmitted packet.
12. In some embodiments, a target base station of a wireless communication network includes: wireless communication circuitry; and processor circuitry communicatively connected to the wireless communication circuitry, the processor circuitry configured to cause the target base station to perform steps according to any of examples 1-11.
13. In some embodiments, an apparatus includes: a processor configured to cause a target base station to perform steps according to any of examples 1-11.
14. In some embodiments, an apparatus includes: means for performing steps according to any of examples 1-11.
15. In some embodiments, a method of performing communications of a Multicast and Broadcast Services (MBS) session includes a wireless communication device receiving, from a first base station of a wireless network, a multicast transmission including at least one data packet of a multicast session; receiving, from the first base station, an instruction to perform a handover to a second base station of the wireless network; in response to receiving the instruction, stopping receiving transmissions from the first base station and establish a connection with the second base station; and receiving, from the second base station, a unicast transmission including a next sequential data packet of the multicast session following a last data packet of the multicast session received from the first base station, wherein the next sequential data packet was previously included in a multicast transmission from the first base station after the wireless communication device stopped receiving transmissions from the first base station.
16. In some embodiments according to example 15, the method further includes: transmitting, to the second base station, prior to receiving the unicast transmission, an identifier of the next sequential packet.
17. In some embodiments according to any of examples 15-16, the method further includes: receiving, from the second base station, a unicast transmission including a dropped data packet of the multicast session, wherein the dropped data packet was included in a multicast transmission from the first base station prior to the instruction to perform the handover, but was not properly received by the UE.
18. In some embodiments according to example 17, the method further includes: transmitting, to the second base station, prior to receiving the unicast transmission including the dropped data packet, an identifier of the dropped data packet.
19. In some embodiments according to any of examples 15-18, the method further includes: receiving, from the second base station, a multicast transmission including at least one data packet of the multicast session.
20. In some embodiments according to any of examples 15-19, the instruction to perform the handover to a second base station includes configuration information for establishing the connection with the second base station for multicast transmissions.
21. In some embodiments, a wireless communication device operating in a wireless communication network includes: wireless communication circuitry; and processor circuitry communicatively connected to the wireless communication circuitry, the processor circuitry configured to cause the wireless communication device to perform steps according to any of examples 15-20.

22. In some embodiments, an apparatus includes: a processor configured to cause a wireless communication device to perform steps according to any of examples 15-20.
23. In some embodiments, an apparatus includes: means for performing steps according to any of examples 15-20.
24. In some embodiments, a method of performing communications of a Multicast and Broadcast Services (MBS) session includes a first base station of a wireless communication network transmitting, to a user equipment (UE) a multicast transmission including at least one data packet of a multicast session; in response to determining to initiate a handover procedure to handover the UE to a second base station of the wireless communication network, transmitting to the UE an instruction to perform the handover; subsequent to transmitting the instruction, providing to the second base station an indication of a next packet of the MBS session to be transmitted to the UE; subsequent to transmitting the instruction, beginning forwarding to the second base station packets of the MBS session to be transmitted to the UE, the forwarded packets of the MBS session including the next packet; and stopping forwarding the packets of the MBS session in response to receiving from the second base station an indication that the handover is complete.
25. In some embodiments according to example 24, the method further includes: providing to the second base station a handover request including information regarding the MBS session.
26. In some embodiments according to example 25, the method further includes: receiving from the second base station a handover request acknowledge message indicating MBS session configuration information for the second base station; and including the MBS session configuration information for the second base station in the instruction to perform the handover.
27. In some embodiments, a first base station operating in a wireless communication network includes: wireless communication circuitry; and processor circuitry communicatively connected to the wireless communication circuitry, the processor circuitry configured to cause the first base station to perform steps according to any of examples 24-26.
28. In some embodiments, an apparatus includes: a processor configured to cause a first base station to perform steps according to any of examples 24-26.
29. In some embodiments, an apparatus includes: means for performing steps according to any of examples 24-26.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of performing communications of a Multicast and Broadcast Services (MBS) session, the method comprising:

by a target base station of a wireless communication network:

receiving, from a source base station of the wireless communication network, as part of a handover of the MBS session for a user equipment (UE) from the source base station to the target base station, a value of a packet data convergence protocol sequence number (PDCP SN) of a next physical data unit (PDU) of the MBS session for the UE;

receiving, from the UE, the value of the PDCP SN of the next PDU and a value of a PDCP SN of a missed PDU of the MBS session, wherein the missed PDU was previously transmitted by the source base station via a peer-to-multiple PTM) message;

transmitting the missed PDU to the UE via a peer-to-peer (PTP) message based on the value of the PDCP SN of the missed PDU received from the UE;

transmitting the next PDU of the MBS session to the UE via a PTP message based on the value of the PDCP SN of the next PDU received from the source base station and from the UE;

receiving, from a user plane function (UPF), additional PDUs for the MBS session; and allocating PDCP SNs for the respective additional PDUs for the MBS session based on respective headers of the respective additional PDUs.

2. The method of claim 1, wherein the allocated PDCP SNs for the respective additional PDUs for the MBS session are based on headers of the respective additional PDUs other than sequence numbers of respective General Packet Radio Service (GPRS) Tunnelling Protocol user-plane (GTP-U) headers.

3. The method of claim 1, comprising:

receiving, from the source base station of the wireless communication network, a request to initiate the handover of the MBS session for the UE.

4. The method of claim 1, wherein the value of the PDCP SN of the missed PDU is received from the UE in a Packet Data Convergence Protocol (PDCP) status report.

5. The method of claim 1, further comprising:

determining whether to transmit the additional PDUs for the MBS session via peer-to-peer messages or via peer-to-multiple messages, based at least in part on a number of UEs serviced by the target base station that are subscribed to the MBS session.

6. An apparatus, comprising:

processing circuitry configured to:

receive, from a source base station of a wireless communication network, as part of a handover of a Multicast and Broadcast Services (MBS) session for a user equipment (UE) from the source base station to a target base station, a value of a packet data convergence protocol sequence number (PDCP SN) of a next physical data unit (PDU) of the MBS session for the UE;

receive, from the UE, the value of the PDCP SN of the next PDU and a value of a PDCP SN of a missed PDU of the MBS session, wherein the missed PDU was previously transmitted by the source base station via a peer-to-multiple (PTM) message;

transmit the missed PDU to the UE via a peer-to-peer (PTP) message based on the value of the PDCP SN of the missed PDU received from the UE;

provide the next PDU of the MBS session for transmission to the UE via a PTP message based on the value of the PDCP SN of the next PDU received from the source base station and from the UE;

receive, from a user plane function (UPF), additional PDUs for the MBS session; and allocate PDCP SNs for the respective additional PDUs for the MBS session based on respective headers of the respective additional PDUs.

7. The apparatus of claim 6, wherein the allocated PDCP SNs for the respective additional PDUs for the MBS session are based on headers of the respective additional PDUs other than sequence numbers of respective General Packet Radio Service (GPRS) Tunnelling Protocol user-plane (GTP-U) headers.

8. The apparatus of claim 6, wherein the processing circuitry is configured to:

receive, from the source base station of the wireless communication network, a request to initiate the handover of the MBS session for the UE.

9. The apparatus of claim 6, wherein the value of the PDCP SN of the missed PDU is received from the UE in a Packet Data Convergence Protocol (PDCP) status report.

10. The apparatus of claim 6, wherein the processing circuitry is configured to:

determine whether to transmit the additional PDUs for the MBS session via peer-to-peer messages or via peer-to-multiple messages, based at least in part on a number of UEs serviced by the target base station that are subscribed to the MBS session.

11. A non-transitory computer-readable memory medium storing instructions that, when executed by a processor of a target base station of a wireless communication network, cause the target base station to:

receive, from a source base station of the wireless communication network, as part of a handover of a Multicast and Broadcast Services (MBS) session for a user equipment (UE) from the source base station to the target base station, a value of a packet data convergence protocol sequence number (PDCP SN) of a next physical data unit (PDU) of the MBS session for the UE;

receive, from the UE, the value of the PDCP SN of the next PDU and a value of a PDCP SN of a missed PDU of the MBS session, wherein the missed PDU was previously transmitted by the source base station via a peer-to-multiple (PTM) message:

transmit the missed PDU to the UE via a peer-to-peer (PTP) message based on the value of the PDCP SN of the missed PDU received from the UE;

transmit the next PDU of the MBS session to the UE via a PTP message based on the value of the PDCP SN of the next PDU received from the source base station and from the UE;

receive, from a user plane function (UPF), additional PDUs for the MBS session; and allocate PDCP SNs for the respective additional PDUs for the MBS session based on respective headers of the respective additional PDUs.

12. The non-transitory computer-readable memory medium of claim 11, wherein the allocated PDCP SNs for the respective additional PDUs for the MBS session are based on headers of the respective additional PDUs other than sequence numbers of respective General Packet Radio Service (GPRS) Tunnelling Protocol user-plane (GTP-U) headers.

13. The non-transitory computer-readable memory medium of claim 11, wherein the instructions cause the target base station to:

receive, from the source base station of the wireless communication network, a request to initiate the handover of the MBS session for the UE.

14. The non-transitory computer-readable memory medium of claim 11, wherein the value of the PDCP SN of the missed PDU is received from the UE in a Packet Data Convergence Protocol (PDCP) status report.

* * * * *